United States Patent
Rugg et al.

(10) Patent No.: US 10,801,351 B2
(45) Date of Patent: Oct. 13, 2020

(54) SEAL ASSEMBLY FOR GAS TURBINE ENGINE

(71) Applicant: United Technologies Corporation, Farmington, CT (US)

(72) Inventors: Kevin L. Rugg, Fairfield, CT (US); Winston Gregory Smiddy, Saco, ME (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 161 days.

(21) Appl. No.: 15/955,590

(22) Filed: Apr. 17, 2018

(65) Prior Publication Data
US 2019/0316481 A1    Oct. 17, 2019

(51) Int. Cl.
| | |
|---|---|
| *F01D 11/08* | (2006.01) |
| *F01D 9/02* | (2006.01) |
| *F01D 11/00* | (2006.01) |
| *F01D 5/30* | (2006.01) |

(52) U.S. Cl.
CPC .............. *F01D 11/08* (2013.01); *F01D 9/023* (2013.01); *F01D 11/006* (2013.01); *F01D 5/3007* (2013.01); *F05D 2240/11* (2013.01); *F05D 2240/55* (2013.01); *F05D 2240/90* (2013.01); *F05D 2260/201* (2013.01); *F05D 2300/6033* (2013.01)

(58) Field of Classification Search
CPC ...... F01D 11/08; F01D 25/24; F05D 2240/11; F05D 2260/201
See application file for complete search history.

(56) References Cited

U.S. PATENT DOCUMENTS

| | | | | |
|---|---|---|---|---|
| 4,497,610 A | * | 2/1985 | Richardson | F01D 9/04 415/116 |
| 5,593,276 A | * | 1/1997 | Proctor | F01D 11/18 415/138 |
| 5,738,490 A | * | 4/1998 | Pizzi | F01D 11/08 415/139 |

(Continued)

FOREIGN PATENT DOCUMENTS

| | | |
|---|---|---|
| EP | 1918526 | 5/2008 |
| EP | 1965032 | 9/2008 |

(Continued)

OTHER PUBLICATIONS

European Search Report for European Patent Application No. 19169628.5 dated Jul. 22, 2019.

*Primary Examiner* — Justin D Seabe
*Assistant Examiner* — Jackson N Gillenwaters
(74) *Attorney, Agent, or Firm* — Carlson, Gaskey & Olds, P.C.

(57) ABSTRACT

A seal assembly for a gas turbine engine according to an example of the present disclosure includes, among other things, a seal that has a sealing portion that extends from an engagement portion. The sealing portion has a seal face that extends circumferentially between first and second mate faces. The engagement portion defines an internal cavity that extends circumferentially between the first and second mate faces, and the engagement portion has an impingement face opposite the seal face that defines an elongated opening to the internal cavity. A method of sealing is also disclosed.

19 Claims, 7 Drawing Sheets

(56) References Cited

U.S. PATENT DOCUMENTS

| | | | |
|---|---|---|---|
| 6,932,566 B2* | 8/2005 | Suzumura | F01D 11/08 |
| | | | 415/135 |
| 7,434,670 B2 | 10/2008 | Good et al. | |
| 7,871,246 B2* | 1/2011 | Liang | F01D 5/187 |
| | | | 416/97 R |
| 8,246,299 B2* | 8/2012 | Razzell | F01D 11/005 |
| | | | 415/173.1 |
| 8,834,105 B2 | 9/2014 | Albers et al. | |
| 10,415,408 B2* | 9/2019 | Bunker | F01D 9/065 |
| 10,443,435 B2* | 10/2019 | Hayford | F01D 25/12 |
| 2005/0129499 A1 | 6/2005 | Morris et al. | |
| 2007/0048122 A1* | 3/2007 | Van Suetendael, IV | |
| | | | B01D 46/40 |
| | | | 415/115 |
| 2012/0292856 A1* | 11/2012 | Pelletier | F01D 9/04 |
| | | | 277/345 |
| 2013/0205793 A1* | 8/2013 | Xu | F23R 3/06 |
| | | | 60/754 |
| 2014/0023490 A1 | 1/2014 | Hillier | |
| 2016/0084101 A1* | 3/2016 | McCaffrey | F01D 11/14 |
| | | | 415/173.3 |
| 2016/0097303 A1 | 4/2016 | Baldiga et al. | |
| 2016/0290144 A1* | 10/2016 | Roussille | F01D 9/04 |
| 2016/0333741 A1 | 11/2016 | Stapleton | |
| 2016/0376921 A1 | 12/2016 | O'Leary et al. | |
| 2017/0248030 A1* | 8/2017 | Marusko | F01D 11/24 |
| 2017/0268362 A1 | 9/2017 | McCaffrey et al. | |
| 2017/0356308 A1* | 12/2017 | Rammohan | F01D 25/145 |

FOREIGN PATENT DOCUMENTS

| | | |
|---|---|---|
| EP | 3219924 | 9/2017 |
| WO | 20150138027 | 9/2015 |

* cited by examiner

SEAL ASSEMBLY FOR GAS TURBINE ENGINE

BACKGROUND

This disclosure relates to sealing for adjacent components of a gas turbine engine.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged in an array. The arc segments are exposed to relatively hot gases in the gas flow path and may be configured to receive cooling airflow to cool portions of the shrouds.

SUMMARY

A seal assembly for a gas turbine engine according to an example of the present disclosure includes a seal that has a sealing portion that extends from an engagement portion. The sealing portion has a seal face that extends circumferentially between first and second mate faces. The engagement portion defines an internal cavity that extends circumferentially between the first and second mate faces, and the engagement portion has an impingement face opposite the seal face that defines an elongated opening to the internal cavity.

In a further embodiment of any of the foregoing embodiments, the elongated opening is a slot that extends circumferentially along the impingement face.

In a further embodiment of any of the foregoing embodiments, the internal cavity extends from a first opening along the first mate face to a second opening along the second mate face.

In a further embodiment of any of the foregoing embodiments, the elongated opening is a slot that extends from the first opening to the second opening.

A further embodiment of any of the foregoing embodiments includes a mounting block including an interface portion extending from a mounting portion, the interface portion abutting the engagement portion to limit relative movement, and the mounting portion defining an aperture that receives a fastener to mechanically attach the mounting portion to an engine static structure.

In a further embodiment of any of the foregoing embodiments, the interface portion has a dovetail geometry that extends through the first opening to mate with ramped surfaces of the internal cavity and bound movement of the seal relative to the mounting block.

In a further embodiment of any of the foregoing embodiments, the mounting block is a first mounting block and a second mounting block, and the interface portion of the first mounting block is received in the first opening and the interface portion of the second mounting block received in the second opening to secure the seal to the engine static structure.

In a further embodiment of any of the foregoing embodiments, the seal is made of a first material including a ceramic material, and the seal has a unitary construction.

In a further embodiment of any of the foregoing embodiments, the mounting block is made of a second, different material.

In a further embodiment of any of the foregoing embodiments, wherein the seal is a blade outer air seal (BOAS).

A gas turbine engine according to an example of the present disclosure includes an engine case extending along an engine axis, an array of blades rotatable about the engine axis, and an array of blade outer air seals distributed about the array of blades to bound a core flow path. Each of the seals includes an elongated seal body that has a seal face that faces toward the core flow path and an opposed impingement face. The seal body defines an internal cavity that extends circumferentially between opposed mate faces and defines an elongated opening to the internal cavity along the impingement face.

In a further embodiment of any of the foregoing embodiments, the elongated opening is a slot that extends circumferentially a distance between the mate faces.

A further embodiment of any of the foregoing embodiments includes an array of circumferentially spaced apart mounting blocks. The mate faces of adjacent seals of the array of seals are arranged to define a plurality of intersegment gaps. Each of the mounting blocks is arranged along a respective one of the plurality of intersegment gaps and engages surfaces of the respective internal cavity of the adjacent seals, and each of the mounting blocks is mechanically attached to the engine case to limit movement of the adjacent seals relative to the engine case.

In a further embodiment of any of the foregoing embodiments, the engine case defines a plurality of cooling passages that communicate with a cooling source, and each of the plurality of cooling passages defines a passage axis that is oriented such that a projection of the passage axis intersects the seal body.

In a further embodiment of any of the foregoing embodiments, the projection of the passage axis of at least some of the plurality of cooling passages intersects the impingement face. The projection of the passage axis of other passages of the plurality of cooling passages intersects the elongated opening.

A method of sealing of a gas turbine engine according to an example of the present disclosure includes securing a mounting block to an engine static structure such that the mounting block is positioned between mate faces of adjacent blade outer air seals. Each of the adjacent seals include an elongated seal body that has a seal face that bounds a gas path and an opposed impingement face. The seal body defines an internal cavity that extends circumferentially from a respective one of the mate faces, and an elongated opening to the internal cavity that is defined in the impingement face. The method includes the step of ejecting cooling flow from a plurality of cooling passages towards the impingement face.

In a further embodiment of any of the foregoing embodiments, the elongated opening is a slot, and the slot is substantially exposed and free of any obstructions when in an assembled position.

In a further embodiment of any of the foregoing embodiments, the engine static structure is an engine case that defines the plurality of cooling passages, and each of the plurality of cooling passages defines a passage axis that is oriented such that a projection of the passage axis intersects the seal body.

In a further embodiment of any of the foregoing embodiments, the projection of the passage axis of at least some passages of the plurality of cooling passages intersects the impingement face.

In a further embodiment of any of the foregoing embodiments, the projection of the passage axis of at least some passages of the plurality of cooling passages intersects the elongated opening.

The various features and advantages of this invention will become apparent to those skilled in the art from the following detailed description of an embodiment. The drawings that accompany the detailed description can be briefly described as follows.

DETAILED DESCRIPTION

Figure 1:
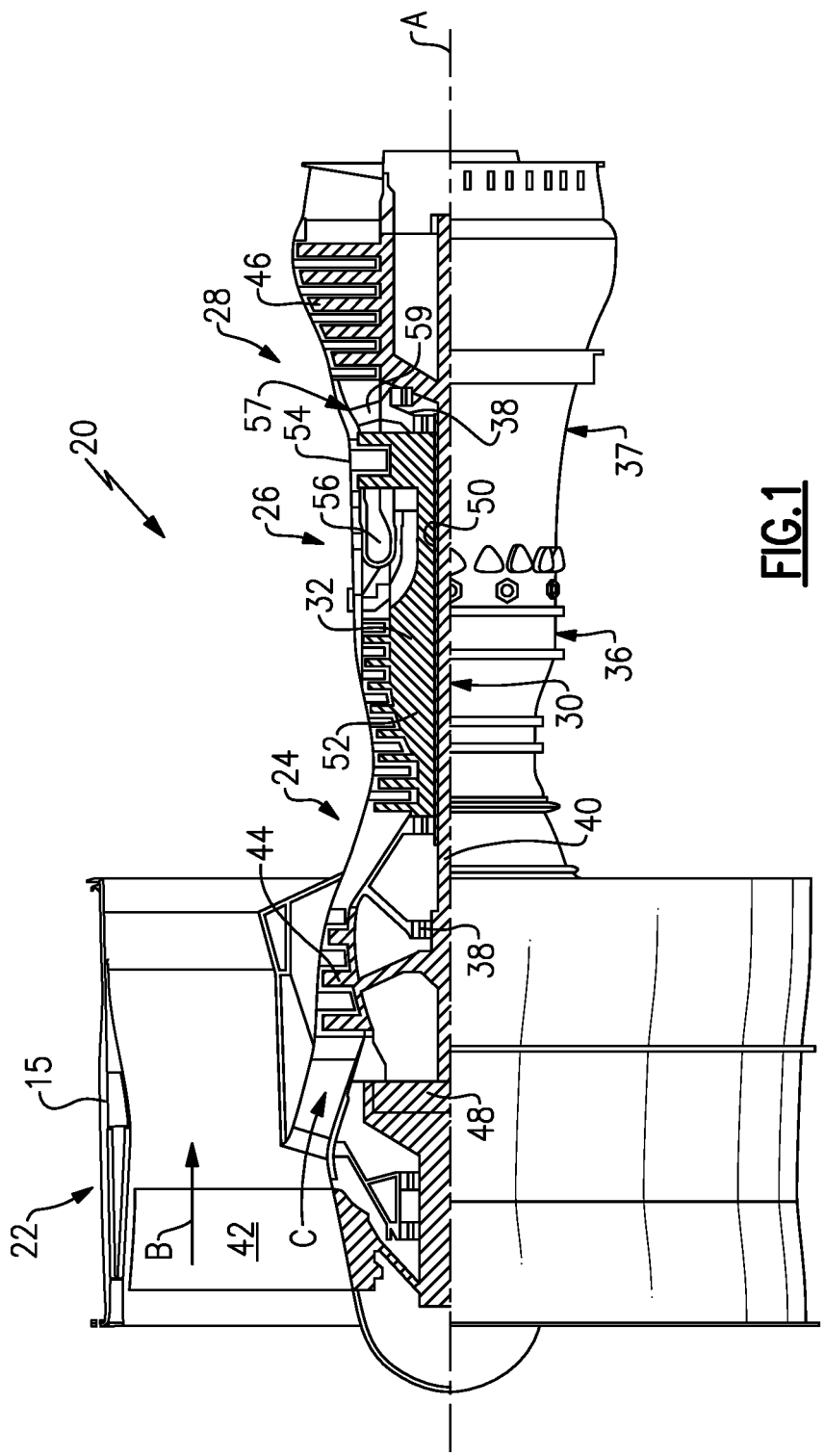
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
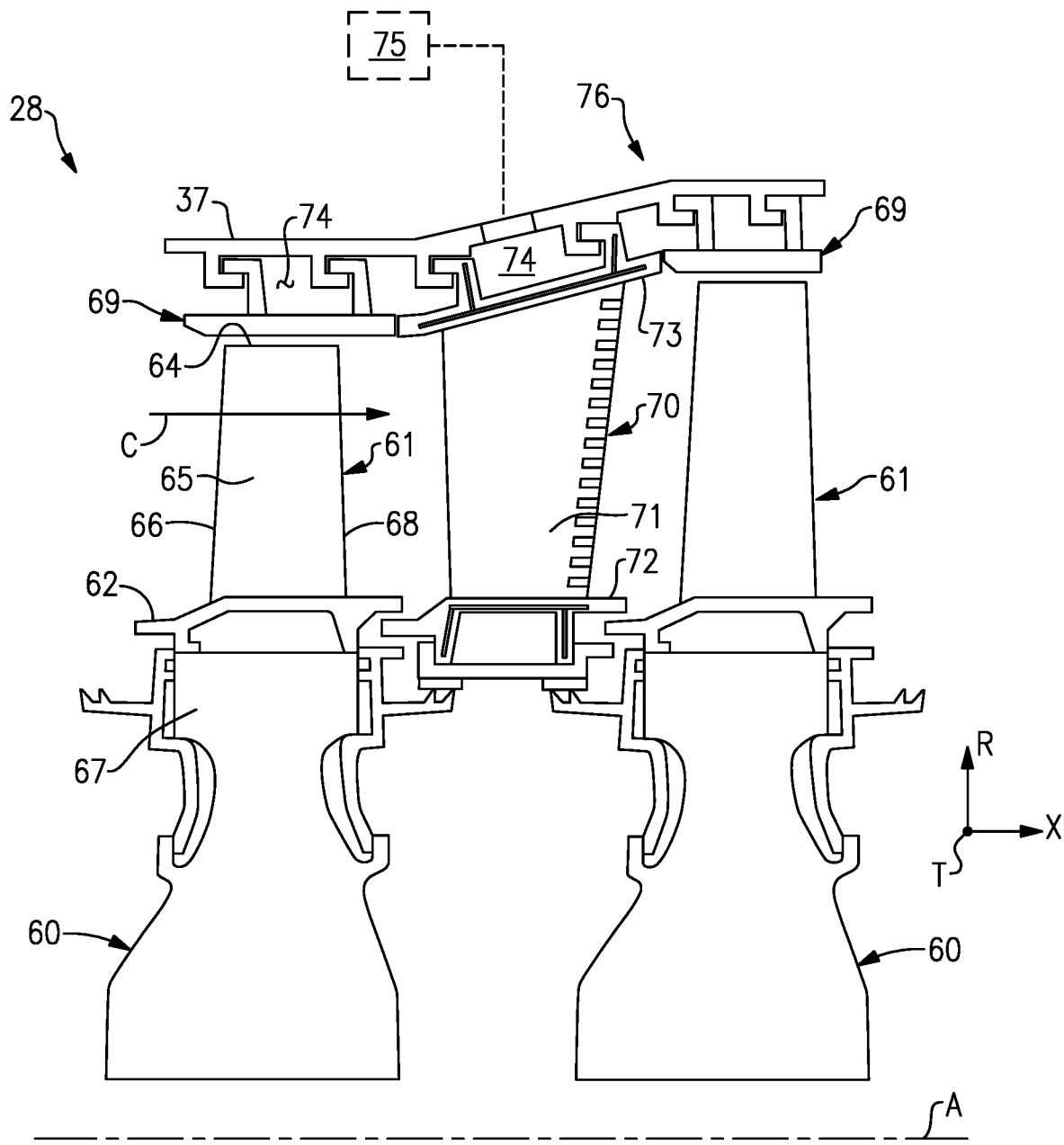
FIG. 2 shows an airfoil arrangement for a turbine section.

FIG. 2 shows selected portions of the turbine section 28 including a rotor 60 carrying one or more blades or airfoils 61 that are rotatable about the engine axis A. In this disclosure, like reference numerals designate like elements where appropriate and reference numerals with the addition of one-hundred or multiples thereof designate modified elements that are understood to incorporate the same features and benefits of the corresponding original elements. Each airfoil 61 includes a platform 62 and an airfoil section 65 extending in a radial direction R from the platform 62 to a tip 64. The airfoil section 65 generally extends in a chordwise or axial direction X between a leading edge 66 and a trailing edge 68. A root section 67 of the airfoil 61 is mounted to, or integrally formed with, the rotor 60. A blade outer air seal (BOAS) 69 is spaced radially outward from the tip 64 of the airfoil section 65. The BOAS 69 can include a plurality of seal arc segments (one shown in FIG. 3 at 169) that are circumferentially arranged in an annulus around the engine axis A. An array of the BOAS 69 are distributed about an array of the airfoils 61 to bound the core flow path C.

A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes an array of airfoils 61, vanes 70, and BOAS 69 arranged circumferentially about the engine axis A.

One or more cooling sources 75 (one shown) are configured to provide cooling air to one or more cooling cavities or plenums 74 defined by an engine static structure such as the engine case 37 or another portion of the engine static structure 36 (FIG. 1). The engine case 37 extends along the engine axis A. In the illustrated example of FIG. 2, the plenums 74 are defined between an engine case 37 and the outer platform 73 and/or BOAS 69. The engine case 37 provides a portion of the engine static structure 36 (FIG. 1) and extends along the engine axis A. The plenums 74 are configured to receive pressurized cooling flow from the cooling source(s) 75 to cool portions of the airfoil 61, BOAS 69 and/or vane 70. Cooling sources 75 can include bleed air from an upstream stage of the compressor section 24 (FIG. 1), bypass air, or a secondary cooling system aboard the aircraft, for example. Each of the plenums 74 can extend in a circumferential or thickness direction T between adjacent airfoils 61, BOAS 69 and/or vanes 70. The tips 64 of each of the airfoil sections 65 and adjacent BOAS 69 are in close radial proximity to reduce the amount of gas flow that escapes around the tips 64 through a corresponding clearance gap.

Figure 3:
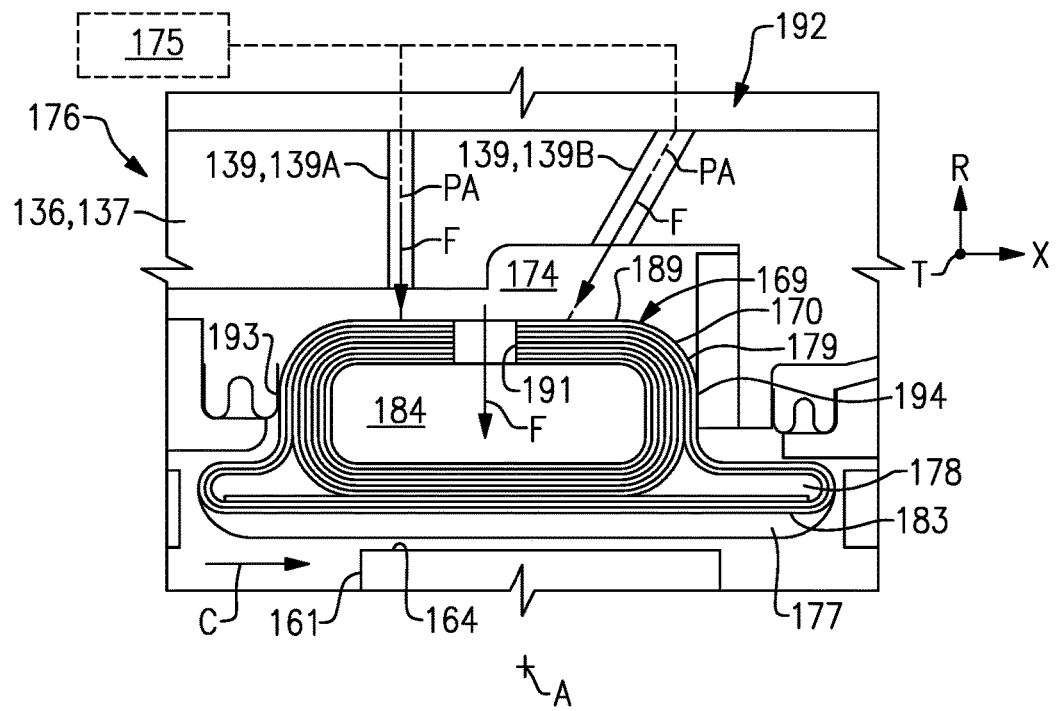
FIG. 3 illustrates a sectional view of a seal assembly including a seal.
Figure 4:
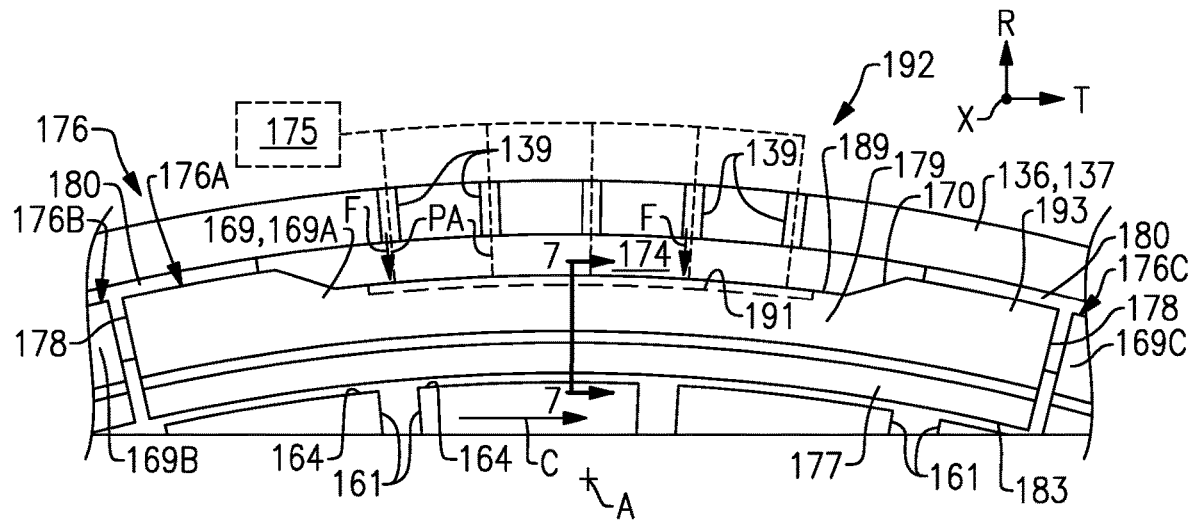
FIG. 4 illustrates an axial view of adjacent seal assemblies.
Figure 5:
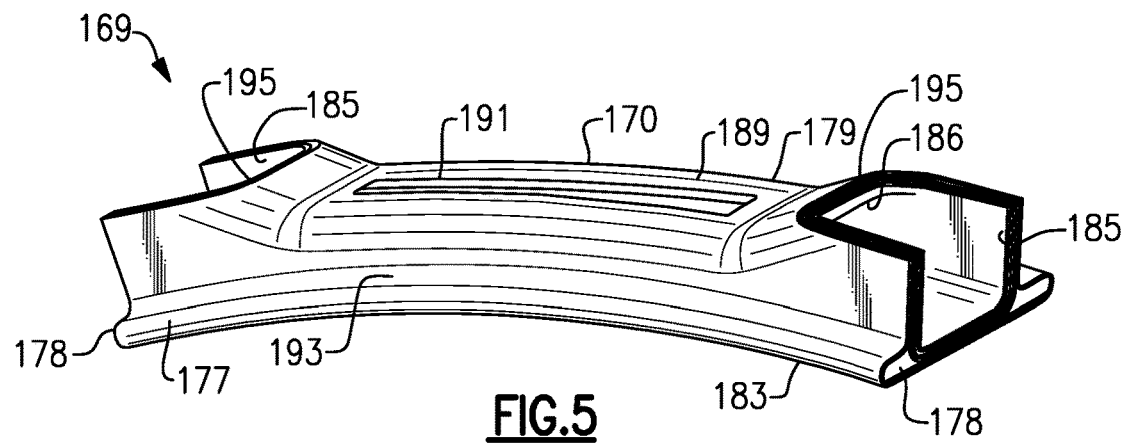
FIG. 5 illustrates an isolated perspective view of the seal of FIG. 3.
Figure 6:
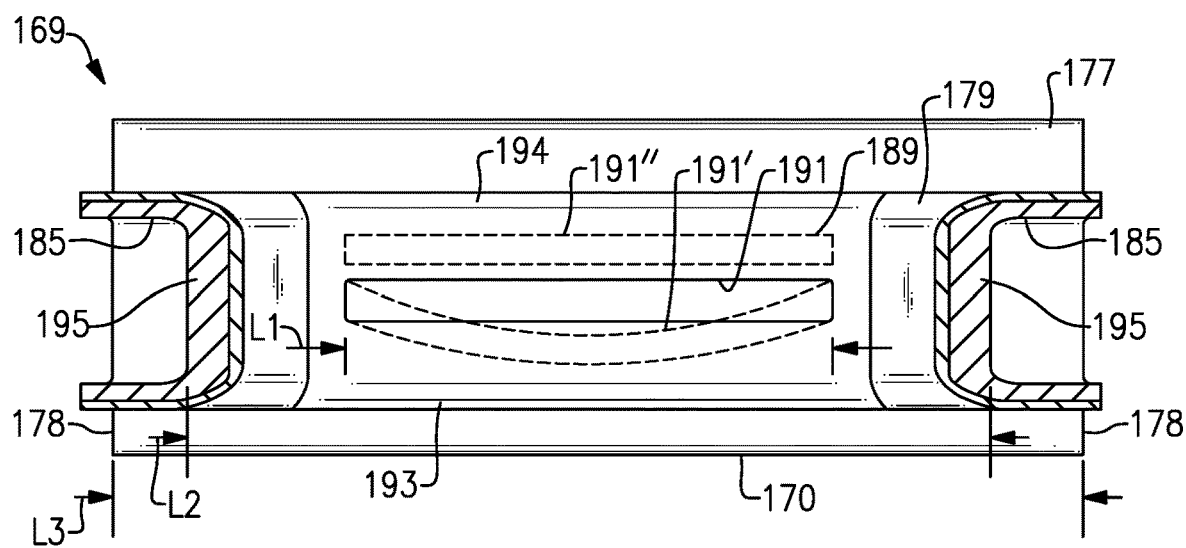
FIG. 6 illustrates a plan view of the seal of FIG. 3.
Figure 7:
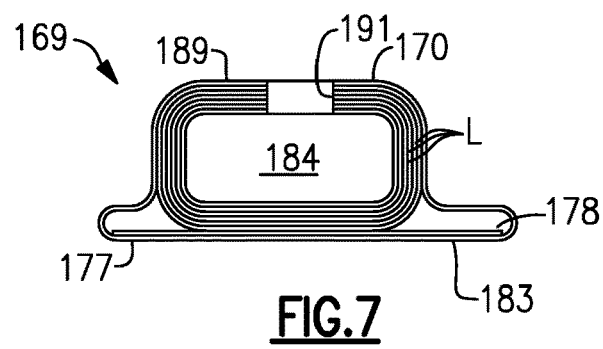
FIG. 7 illustrates a sectional view of the seal along line 7-7 of FIG. 4.
Figure 8:
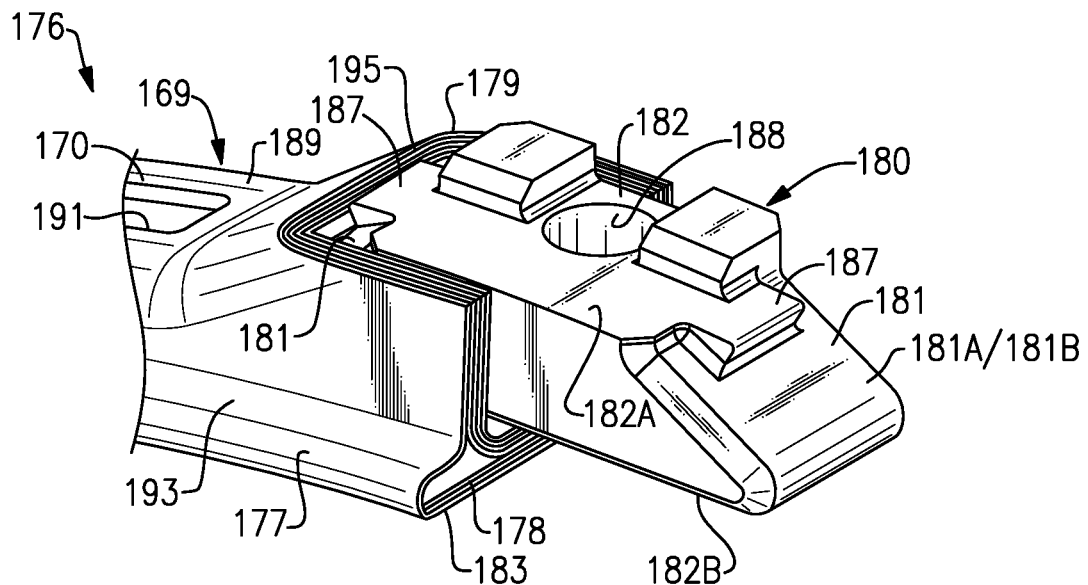
FIG. 8 illustrates a perspective view of a support inserted into the seal of FIG. 3.
Figure 9:
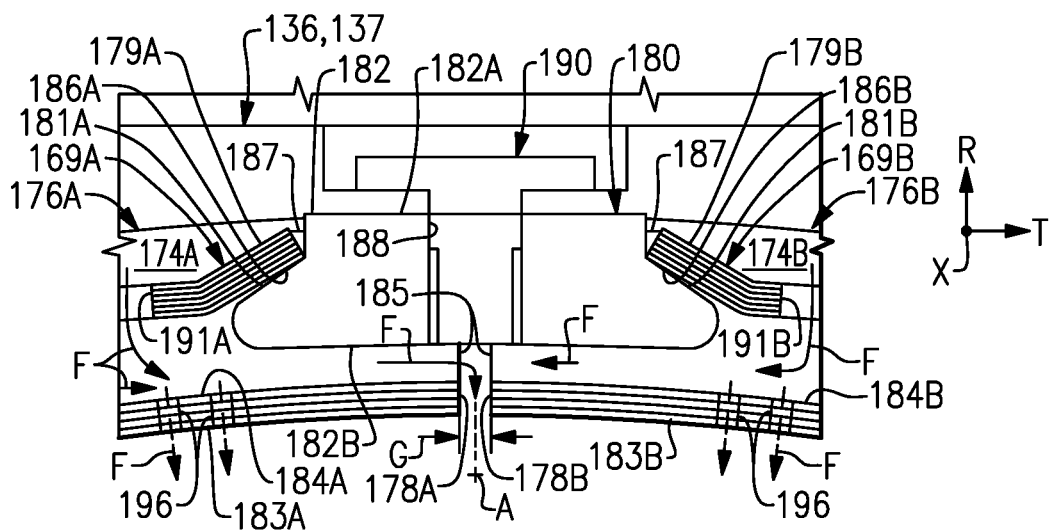
FIG. 9 illustrates a sectional view of the support of FIG. 8 between two adjacent seals.

FIGS. 3-9 illustrate an exemplary seal assembly 176 for sealing portions a gas turbine engine. The seal assembly 176 can be utilized for the seal assembly 76 of FIG. 2 or incorporated into a portion of the engine 20 of FIG. 1, for example. In the illustrated example of FIGS. 3-9, the seal 169 is a blade outer air seal (BOAS). FIG. 3 is sectional view of the seal assembly 176 in an installed position. FIG. 4 is an axial view of adjacent seal assemblies 176 (indicated as 176A, 176B, 176C). FIGS. 5-7 illustrate perspective, plan and sectional views of the seal 169. FIG. 8 illustrates a support or mounting block 180 of the seal assembly 176 inserted into the seal 169. FIG. 9 illustrates a sectional view of the mounting block 180 between two adjacent seals 169 (indicated as 169A, 169B). Although the components discussed herein primarily refer to a BOAS in the turbine section 28, the teachings herein can also be utilized for other components of the engine 20, such as one of the platforms 62, 72, 73, an upstream stage of the compressor section 24, or combustor panels or liners defining portions of a combustion chamber located in the combustor section 26.

Referring to FIGS. 3 and 4, each seal assembly 176 includes a seal 169 and at least one support or mounting block 180. Each seal 169 is arranged in close proximity to an airfoil tip 164 during operation of the engine. An array of the seals 169 is circumferentially distributed about axis A and about an array of blades or airfoils 161 to bound a core flow path C (three seals 169A-169C shown in FIG. 4 for illustrative purposes).

Each seal 169 includes an elongated main (or seal) body 170 that extends in a circumferential direction T between opposed (or first and second) mate faces 178 and extends in an axial direction X between a leading edge portion 193 and a trailing edge portion 194. The main body 170 can have a generally elongated and arcuate profile, as illustrated by FIGS. 4 and 5. The seal 169 includes a sealing portion 177 that extends circumferentially between the mate faces 178. The sealing portion 177 includes a front side or seal face 183 that extends circumferentially between the mate faces 178. The seal face 183 faces toward and bounds a gas path, such as the core flow path C, when the seal 169 is located in an installed position. The sealing portion 177 includes a backside or impingement face 189 that is opposite to the seal face 183.

Each seal 169 also includes an engagement portion 179 that extends between the mate faces 178. Each engagement portion 179 can extend radially outward from the sealing portion 177 when in an installed position. The leading and trailing edge portions 193, 194 includes the radially extending walls of the main body 170 along the sealing portion 177 and/or the engagement portion 179 that span between the mate faces 178.

The seal 169 includes an internal cavity 184 defined by the main body 170 that extends inwardly from at least one or a pair of openings 185 along each of the respective mate faces 178 (shown in FIG. 5). In the illustrated example of FIGS. 3-9, the internal cavity 184 extends circumferentially between the mate faces 178 and is defined between the sealing portion 177 and the engagement portion 179.

Various materials can be utilized to manufacture the seal 169 and mounting block 180. In some examples, the seal 169 is made of a first material, and the mounting block 180 is made of a second, different material. For example, the first material can include a ceramic or ceramic matrix composite (CMC) material. The seal 169 can be formed from one or more layers L of a CMC layup (FIG. 7). The seal 169 can be made of another material, such as a high temperature metal, alloy, or composite material. The mounting block 180 can be made of a second material such as a high temperature composite, metal, or alloy, such as a nickel-based superalloy, for example. The first and second materials can differ. In other examples, the seal 169 is made of a first material, and the mounting block 180 is made of a second material that is the same as the first material, including any of the materials disclosed herein. The seal 169 is formed to have a unitary construction. In alternative examples, the sealing portion 177 and each engagement portion 179 are separate and distinct components that are mechanically attached to one another with one or more fasteners.

Referring to FIGS. 8 and 9, the mounting block 180 can be arranged to secure one or more of the seals 169 to a housing such as engine case 137, or to another portion of an engine static structure. An adjacent pair of seals 169 are indicated as seals 169A, 169B in FIG. 9. The mounting block 180 includes at least one interface portion 181 extending outwardly from a main body or mounting portion 182. In the illustrated example of FIGS. 8 and 9, the mounting block 180 includes a pair of opposed interface portions 181A, 181B that extend outwardly from the mounting portion 182. Each interface portion 181 is dimensioned to abut the engagement portion 179 of the respective seal 169 to limit relative movement in the radial and/or circumferential directions R, T, for example.

A cross-section of the mounting block 180 can have a generally trapezoidal geometry, as illustrated by FIGS. 8 and 9. Surfaces of each interface portion 181 slope outwardly between a top 182A and bottom 182B of the mounting portion 182. The interface portions 181 can have a dovetail geometry. Each interface portion 181 can be inserted into or otherwise extend through a respective opening 185 to mate with ramped surfaces 186 of the internal cavity 184 (indicated as 186A, 186B in FIG. 9) to bound movement of the seal 169 relative to the mounting block 180. The dovetail geometry circumferentially overlaps with walls of the engagement portions 179A, 179B when in the installed position to secure adjacent pairs of the seals 169A, 169B to the engine case 137. Ends of the interface portions 181 can be contoured guide the interface portions 181 through one of the openings 185 and into the respective internal cavity 184 during installation. The dovetail geometry and contouring can reduce mechanical stress on the seal 169, including seals made of a composite material which can be strong but relative brittle.

Each interface portion 181 can include an outwardly extending retention feature 187. The retention feature 187 is dimensioned to abut against surfaces of the engagement portion 179 to seat the seal 169 during assembly and limit circumferential and/or radial movement.

The mounting block 180 can be secured to the engine case 137 using one or more fasteners 190 (one shown in FIG. 9 for illustrative purposes). Each mounting portion 182 defines an aperture 188 that receives a respective fastener 190 to mechanically attach the mounting portion 182 to the engine case 137 and limit relative movement of one or more seals 169. In the illustrated example of FIG. 9, the fastener 190 is a bolt, and the aperture 188 threadably receives a length of the bolt. In alternative examples, the fastener 190 is a clip or another structure to secure the seal 169 to the engine static structure 136.

In the illustrated example of FIG. 9, the adjacent seals 169A, 169B are arranged in close proximity such that the respective mate faces 178A, 178B define an intersegment gap G that extends a distance in the circumferential direction T. The mounting block 180 is situated between the mate faces 178A, 178B such that the mounting block 180 spans across the intersegment gap G. A portion of the fastener 190 can be circumferentially aligned with one or more of the adjacent mate faces 178A, 178B and/or the intersegment gap G. The interface portions 181 abut against the adjacent seals 169A, 169B to support the adjacent seals 169A, 169B relative to the engine case 137 and limit circumferential movement of the adjacent seals 169A, 169B relative to the engine axis A. The mounting block 180 is arranged between the engagement portions 179A, 179B to circumferentially space apart the seals 169A, 169B. Each mounting block 180 secures the engagement portions 179A, 179B to the engine case 137 when in the installed position. In alternative examples, the mounting block 180 is positioned at another location than along the intersegment gap G to secure the seal 169 to the engine case 137, such as a midspan of the seal 169.

Referring back to FIGS. 3-4, with continued reference to FIGS. 5-9, the seal assembly 176 defines a cooling arrangement 192 to deliver cooling flow F to portions of the seal 169 and/or other portions of the seal assembly 176 or components of the engine. The engine case 137 or another portion of the engine static structure 136 defines at least one or a plurality of cooling passages 139. Plenum(s) 174 extend between the impingement face 189 and the engine case 137. The cooling passages 139 are configured to communicate with and receive cooling flow from cooling source(s) 175.

Each of the cooling passages 139 defines a respective passage axis PA that is oriented such that a projection of the passage axis PA intersects the main body 170 of the seal 169. The cooling passages 139 eject cooling flow F into the plenum(s) 174 and toward the main body 170 of the seal 169 in a direction along the passage axis PA.

The projection of the passage axis PA of at least some of the cooling passages 139 can intersect the impingement face 189 such that the cooling passages 139 provide localized impingement cooling to portions of the main body 170 adjacent to the impingement face 189. Each passage axis PA can be perpendicular or transverse to the impingement face 189 at the point of intersection (see, e.g., passages 139A and 139B of FIG. 3, respectively). The points of intersection are spaced apart a distance from the elongated opening 191 to allow the cooling flow F to follow along surfaces of the impingement face 189 prior to entry into the elongated opening 191 to cool portions of the seal 169 adjacent surfaces of the internal cavity 184.

The seal 169 is exposed to temperature differentials between the gases in the core flow path C and the cooling flow F from the cooling source 175. Thermal gradients across the seal 169 in a radial direction R may be caused by localized impingement cooling on the impingement face 189, for example, which may cause cracks to form in the seal 169.

The seal 169 can include one or more elongated openings 191 dimensioned to provide stress relief that may otherwise be caused by thermal stress due to thermal gradients in the seal 169 during engine operation. In the illustrated example of FIGS. 3-9, the impingement face 189 of the engagement portion 179 defines at least one elongated opening 191 to the internal cavity 184. The elongated opening 191 is illustrated as a slot that extends circumferentially between mate faces 178 and along the impingement face 189. The elongated opening 191 reduces localized heat transfer coefficient variation in the seal 169, including variation in the radial direction R. Each elongated opening 191 can also be defined to reduce localized heat transfer coefficient variation in the axial and/or circumferential directions X, T. Each elongated opening 191 can be formed by a machining operation after forming the main body 170, or can be formed during the fabrication of the main body 170 by arranging the layers L of the CMC layup (FIG. 7), for example.

Referring to FIG. 6, the slot can be substantially straight or rectangular as illustrated by the elongated opening 191, or the slot can have a curved or complex profile as illustrated by elongated opening 191' (shown in dashed lines). The seal 169 can include at least two slots as illustrated by elongated opening 191 and elongated opening 191" (shown in dashed lines). The elongated opening 191 is spaced apart from each end wall 195 of the engagement portion 179 that bounds the internal cavity 184. A cross-section of the elongated opening 191 can be dimensioned to meter flow into the internal cavity 184 and reduce inefficiencies due to excess cooling flow F that may otherwise be communicated from the plenum(s) 174 to provide localized cooling.

Figure 10:
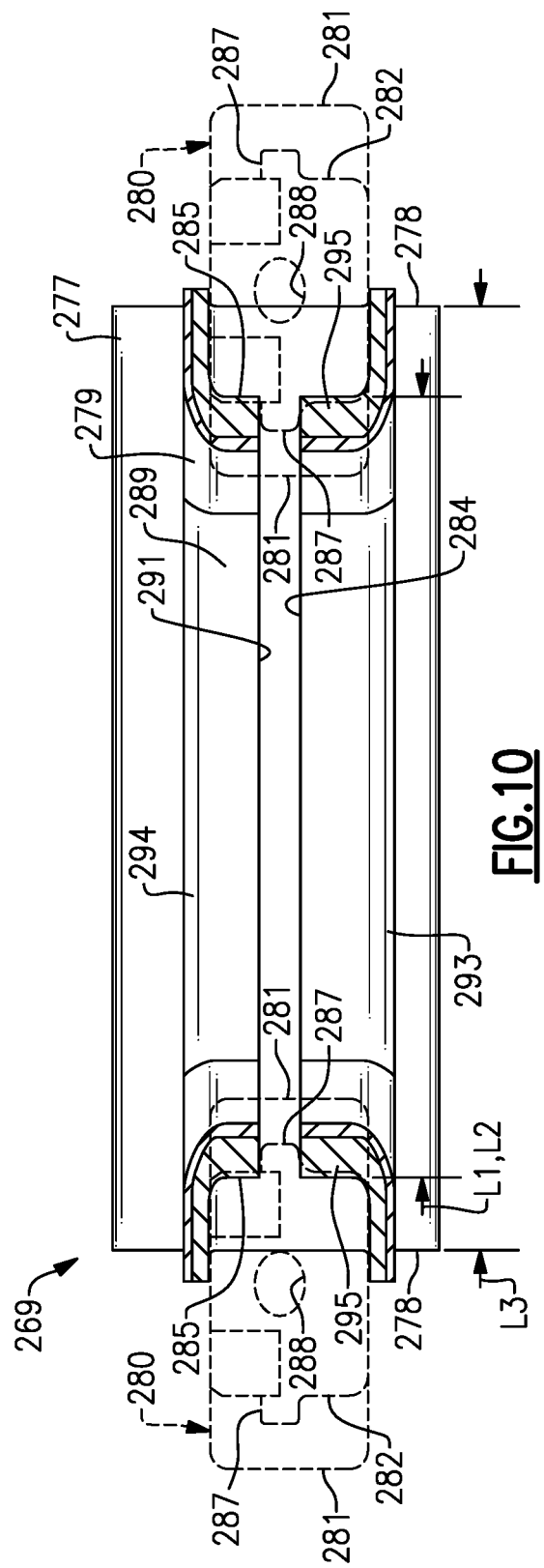
FIG. 10 illustrates a plan view of a seal according to another example.

The dimension of each elongated opening 191 can be set to provide a desired amount of rigidity in the seal 169. A distance between opposed ends of the elongated opening 191 defines a first length L1, a distance between the opposed openings 185 defines a second length L2, and a distance between mate faces 178 defines a third length L3. A ratio of the first and second lengths L1:L2 or the first and third lengths L1:L3 can be at least 0.5, but less than 1.0. In the illustrated example of FIG. 10, elongated opening 291 is a slot that extends from a first opening 285 to a second, opposed opening 285 such that a ratio of the first and second lengths L1:L2 is 1.0 and a ratio of the first and third lengths L1:L3 is at least 0.75. The elongated opening 291 completely breaks through each end wall 295 of the engagement portion 279 of seal 269 such that the elongated opening 291 circumferentially overlaps with a respective mounting block 280 (shown in dashed lines). Elongated openings 191/291 having a relatively greater length L1 can provide increased stress relief provided by the relatively large and contiguous openings as compared to openings having a lesser length or area. In some examples, each of the openings 191/291 has a cross-sectional area that is between 10-90% of a total surface area of the impingement face 189/289, or more narrowly between 20-50% of the total surface area.

Figure 11:
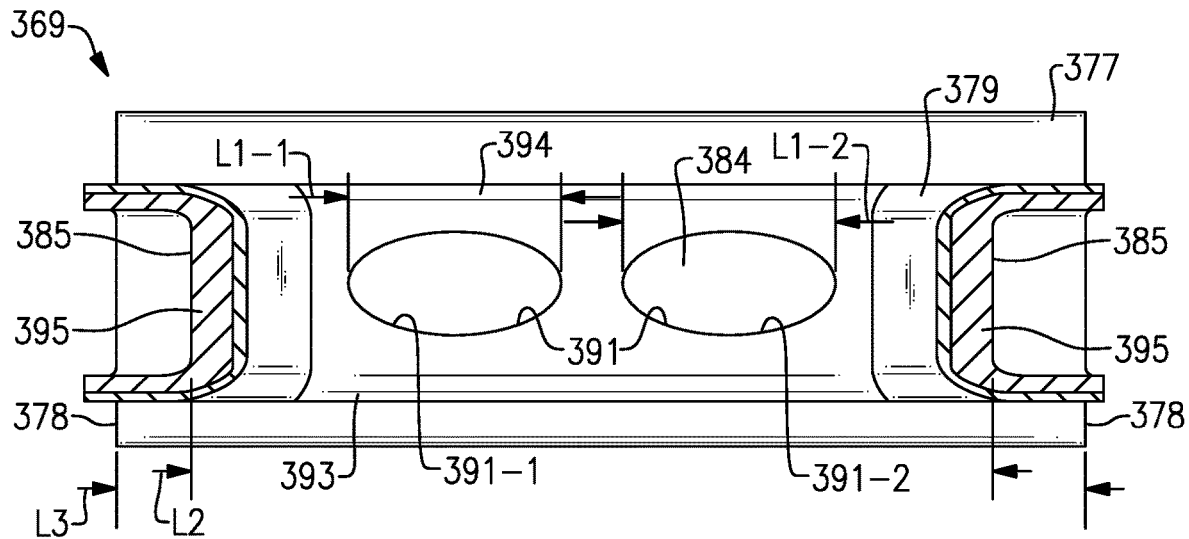
FIG. 11 illustrates a plan view of a seal according to yet another example.

Although the teachings herein primarily refer to an elongated opening 191 in the shape of a slot, other geometries of the elongated opening 191 can be utilized with the seal assembly 176. In the illustrated example of FIG. 11, seal 369 includes a plurality of elongated openings 391 (indicated as 391-1 and 391-2) each having an elliptical geometry. The elongated openings 391-1, 391-2 define first lengths L1-1, L1-2, respectively. A ratio of a sum of the first lengths and the second length (L1-1, L1-2):L2 or the third length (L1-1, L1-2):L3 can be at least 0.5, or more narrowly at least 0.8, for example. The first lengths L1-1, L1-2 can be the same or can differ.

The elongated openings 191/291/391 improve the ability of the portions of the seal 169/269/369 on opposed sides of the elongated openings 191/291/391 to independently cup or flex, which may occur due to asymmetrical heating and/or cooling of portions of the seal 169/269/369. The elongated opening 191/291/391 is substantially exposed and free of any obstructions when in an assembled position to communicate cooling flow F to the internal cavity 184/284/384 through substantially each portion of the elongated openings 191/291/391 and to improve the ability of portions of the seal 169/269/369, such as leading and trailing edge portions 193, 194, to independently cup or flex during engine operation to provide stress relief. The elongated openings 191/291/391 decouples the leading and trailing edge portions 193, 194, thereby improving the ability of the leading edge portion 193 to move relative to the trailing edge portion 194, which may desire to push or expand and contract in opposite directions due to differences in thermal loads on the respective portions 193, 194. The elongated openings 191/291/391 reduces local thermal gradients and thermally-induced strain fields for increased durability of the seal 169/269/369. The location of the elongated openings 191/291/391 serves to directly break the thermally-driven stress field which may otherwise be observed in a backside of the seal 169/269/369, thereby reducing a maximum stress of the seal 169/269/369 during operation of the engine. For the purposes of this disclosure, the term "substantially" means at least 90% unless otherwise indicated. The elongated openings 191/ 291/391 being substantially exposed and free of any obstructions when in the assembled position results in the seal 169/269/369 being mounted to the engine static structure at location(s) that exclude the elongated opening 191/291/391. Said differently, the seal 169/269/369 is not directly supported along a length of the elongated openings 191/291/391.

A method of sealing is as follows. With reference to FIG. 9, a mounting block 180 is positioned between mate faces 178A, 178B of each adjacent pair of seals 169A, 169B. Each of the interface portions 181A, 181B is inserted or otherwise moved in a circumferential direction T through a respective one of the openings 185A, 185B and into abutment with the ramp surfaces 186A, 186B of the engagement portions 179A, 179B to bound movement of the seals 169A, 169B. Thereafter, the fastener 190 is mechanically attached or otherwise secured to the mounting block 180.

Referring to FIGS. 3-4, with continued reference to FIG. 9, during operation of the engine, pressurized cooling flow F is communicated from the cooling source 175 to the cooling passages 139. The cooling passages 139 eject the cooling flow F into the plenum 174 and in a direction toward the impingement face 189 of the seal 169. The cooling flow F can be discharged from the cooling passages 139 at a predetermined pressure and velocity such that the cooling flow F impinges on localized surfaces of the impingement face 189. The cooling flow F circulates from the plenum 174 and into the elongated opening(s) 191. The cooling flow F circulates from the elongated opening(s) 191 and disperses into the internal cavity 184 to cool portions of the seal 169.

The mounting block 180 can be dimensioned relative to surfaces of the internal cavity 184 such that cooling flow F in the internal cavity 184 can exit the openings 185 along the mate faces 178 and into the intersegment gaps G. Communication of the cooling flow F can cool portions of the mate faces 178, thereby improving durability of the seals 169. Communicating the cooling flow F into each intersegment gap G also causes a sealing relationship to be formed, which can reduce a likelihood of ingestion of hot combustion gases from the core flow path C and into the intersegment gap G. In examples, the sealing portion 177 can define one or more film cooling holes 196 (shown in dashed lines in FIG. 9) to eject cooling flow F from the internal cavity 184 into the core flow path C.

Figure 12:
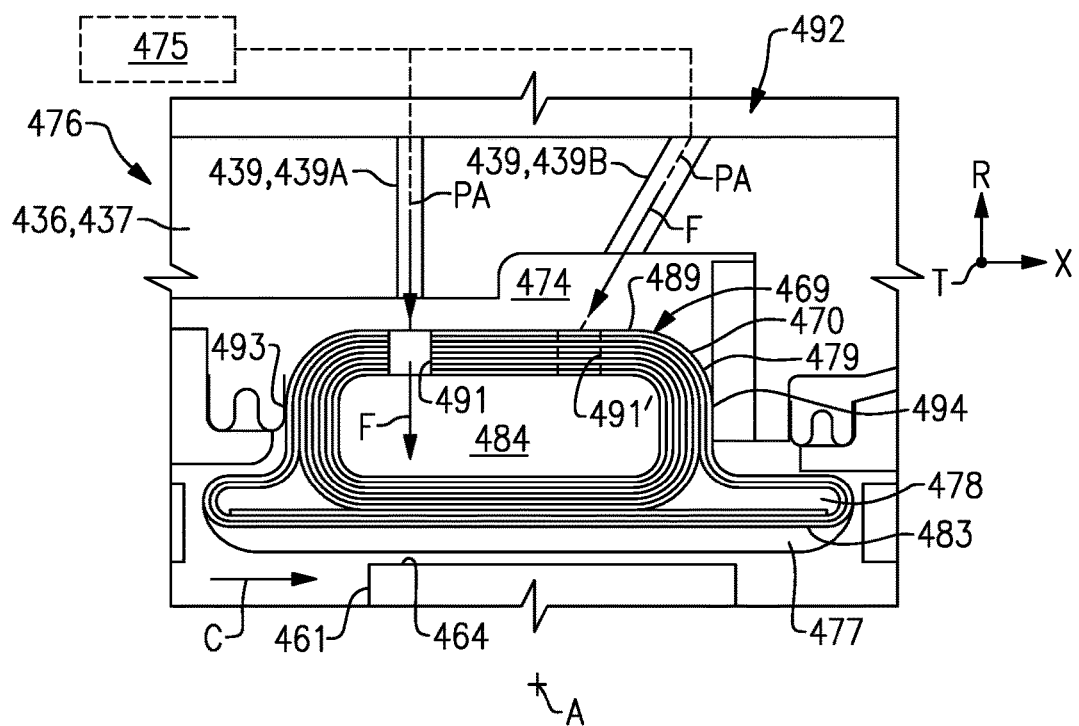
FIG. 12 illustrates a sectional view of a seal assembly according to another example.

FIG. 12 illustrates a seal assembly 476 according to another example. Elongated opening 491 is skewed toward an edge of seal 469 to provide a desired amount of rigidity and localized cooling to portions of the seal 469. In the illustrated example of FIG. 12, the elongated opening 491 is skewed toward leading edge portion 493 relative to the axial direction X. In other examples, elongated opening 491' (indicated in dashed lines) is skewed toward trailing edge portion 494 relative to the axial direction X.

A projection of passage axis PA of at least some of the cooling passages 439 can be aligned with the elongated opening 491. In the illustrated example of FIG. 12, the projection of the passage axis PA of the cooling passage 439A intersects the elongated opening 491, thereby increasing the impingement distance between an outlet of the cooling passage 439A and localized surfaces of the internal cavity 484 that intersect with the projection of the passage axis PA. The increased impingement distance can reduce the heat transfer correlation, which can be beneficial to reduce thermal gradients and more evenly distribute the cooling flow F in the radial direction R. The projection of the passage axis PA of cooling passage 439B intersects impingement face 489, which reduces the impingement distance.

The reduced impingement distance can provide targeted cooling to localized surfaces of the seal 469 and can increase the thermal gradient to more closely match the thermal profiles of adjacent portions of the seal 469.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine comprising:
an engine case extending along an engine axis, wherein the engine case defines a plurality of cooling passages that communicates with a cooling source;
a seal including an elongated seal body having a sealing portion that extends from an engagement portion wherein:
the sealing portion includes a seal face that extends circumferentially between first and second mate faces;
the engagement portion defines an internal cavity that extends circumferentially between the first and second mate faces, and the engagement portion includes an impingement face opposite the seal face that defines an elongated opening to the internal cavity;
the internal cavity extends from a first opening along the first mate face to a second opening along the second mate face; and
the elongated opening is a slot that extends circumferentially along the impingement face from the first opening to the second opening; and
wherein each of the plurality of cooling passage defines a passage axis that is oriented such that a projection of the passage axis intersects the seal body; and
wherein the projection of the passage axis of at least some of the plurality of cooling passages intersects the impingement face, and the projection of the passage axis of other passages of the plurality of cooling passages intersects the elongated opening.

2. The seal assembly as recited in claim 1, further comprising a mounting block including an interface portion extending from a mounting portion, the interface portion abutting the engagement portion to limit relative movement, and the mounting portion defining an aperture that receives a fastener to mechanically attach the mounting portion to an engine static structure.

3. The seal assembly as recited in claim 2, wherein the interface portion has a dovetail geometry that extends through the first opening to mate with ramped surfaces of the internal cavity and bound movement of the seal relative to the mounting block.

4. The seal assembly as recited in claim 3, wherein the mounting block is a first mounting block and a second mounting block, and the interface portion of the first mounting block is received in the first opening and the interface portion of the second mounting block received in the second opening to secure the seal to the engine static structure.

5. The seal assembly as recited in claim 2, wherein the seal is made of a first material including a ceramic material, and the seal has a unitary construction.

6. The seal assembly as recited in claim 5, wherein the mounting block is made of a second, different material.

7. The seal assembly as recited in claim 1, wherein the seal is a blade outer air seal (BOAS).

8. A gas turbine engine comprising:
an engine case extending along an engine axis;
an array of blades rotatable about the engine axis; and
an array of blade outer air seals distributed about the array of blades to bound a core flow path, wherein each of the seals comprises:
an elongated seal body including a seal face that faces toward the core flow path and an opposed impingement face; and
wherein the seal body defines an internal cavity that extends circumferentially between opposed mate faces and defines an elongated opening to the internal cavity along the impingement face, and the elongated opening is a slot that extends circumferentially a distance between the mate faces;
wherein the engine case defines a plurality of cooling passages that communicate with a cooling source, and each of the plurality of cooling passages defines a passage axis that is oriented such that a projection of the passage axis intersects the seal body of a respective one of the blade outer air seals; and
wherein the projection of the passage axis of at least some of the plurality of cooling passages intersects the impingement face of a respective one of the blade outer air seals, and the projection of the passage axis of other passages of the plurality of cooling passages intersects the elongated opening of the respective one of the blade outer air seals.

9. The gas turbine engine as recited in claim 8, further comprising an array of circumferentially spaced apart mounting blocks, wherein the mate faces of adjacent seals of the array of seals are arranged to define a plurality of intersegment gaps, each of the mounting blocks is arranged along a respective one of the plurality of intersegment gaps and engages surfaces of the respective internal cavity of the adjacent seals, and each of the mounting blocks is mechanically attached to the engine case to limit movement of the adjacent seals relative to the engine case.

10. A method of sealing of a gas turbine engine, comprising:
securing a mounting block to an engine static structure such that the mounting block is positioned between mate faces of adjacent blade outer air seals;
wherein each of the adjacent seals comprises:
an elongated seal body including a seal face that bounds a gas path and an opposed impingement face; and
wherein the seal body defines an internal cavity that extends circumferentially from a respective one of the mate faces, and an elongated opening to the internal cavity that is defined in the impingement face, and the elongated opening is a slot; and ejecting cooling flow from a plurality of cooling passages towards the impingement face;

wherein the engine static structure is an engine case that defines the plurality of cooling passages, and each of the plurality of cooling passages defines a passage axis that is oriented such that a projection of the passage axis intersects the seal body; and wherein the projection of the passage axis of at least some passages of the plurality of cooling passages intersects the elongated opening.

11. The method as recited in claim 10, wherein the slot is substantially exposed and free of any obstructions when in an assembled position.

12. The method as recited in claim 10, wherein the projection of the passage axis of at least some passages of the plurality of cooling passages intersects the impingement face.

13. The seal assembly as recited in claim 4, wherein:
the seal is a blade outer air seal (BOAS).

14. The seal assembly as recited in claim 13, wherein:
the engagement portion includes a leading edge wall and a trailing edge wall axially opposed to the leading edge wall, the leading and trailing edge walls extend radially from the sealing portion to a radially facing wall comprising the impingement face, and the leading and trailing edge walls extend circumferentially between the first and second mate faces to axially bound the internal cavity.

15. The seal assembly as recited in claim 14, wherein:
the seal is made of a first material including a ceramic material; and
the seal has a unitary construction.

16. The seal assembly as recited in claim 14, wherein the slot has a curved profile along the impingement face.

17. The gas turbine engine as recited in claim 9, wherein:
the internal cavity extends from a first opening along one of the mate faces to a second opening along another one of the mate faces; and
each mounting block of the array of mounting blocks includes an interface portion extending from a mounting portion, the mounting portion mechanically attached to the engine case, and the interface portion has a dovetail geometry that extends through the first opening to mate with ramped surfaces of the internal cavity and bound movement of the seal body of a respective one of the blade outer air seals relative to the mounting block.

18. The gas turbine engine as recited in claim 17, wherein a distance between opposed ends of the slot defines a first length, a distance between the first and second openings defines a second length, a distance between the mate faces defines a third length, a ratio of the first length and the second length is at least 0.5, and a ratio of the first length and the third length is less than 1.0.

19. The gas turbine engine as recited in claim 18, wherein the ratio of the first length and the second length is 1.0, and the ratio of the first length and the third length is at least 0.75.

* * * * *